US008638486B2

(12) United States Patent
Matsuda et al.

(10) Patent No.: US 8,638,486 B2
(45) Date of Patent: Jan. 28, 2014

(54) OPTICAL MODULATOR AND OPTICAL MODULATION METHOD

(75) Inventors: Keisuke Matsuda, Tokyo (JP); Takashi Sugihara, Tokyo (JP); Keita Mochizuki, Tokyo (JP); Hiroshi Aruga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 13/314,553

(22) Filed: Dec. 8, 2011

(65) Prior Publication Data

US 2012/0314277 A1 Dec. 13, 2012

(30) Foreign Application Priority Data

Jun. 9, 2011 (JP) ................................. 2011-129123

(51) Int. Cl.
*G02F 1/035* (2006.01)
*H01S 4/00* (2006.01)

(52) U.S. Cl.
USPC ............... 359/259; 359/344; 359/337; 385/3

(58) Field of Classification Search
USPC ........................ 359/250, 259, 337, 344; 385/3
See application file for complete search history.

(56) References Cited

U.S. PATENT DOCUMENTS

| 7,715,732 | B2 * | 5/2010 | Koh et al. ...................... 398/194 |
| 7,773,283 | B2 * | 8/2010 | Tanaka et al. ................. 359/237 |
| 7,957,653 | B2 | 6/2011 | Kawanishi et al. |
| 8,400,702 | B2 * | 3/2013 | Tanaka et al. ................. 359/239 |
| 2011/0032594 | A1 * | 2/2011 | Tanaka et al. ................. 359/245 |

FOREIGN PATENT DOCUMENTS

| JP | 6-67128 | 3/1994 |
| JP | 2007-86207 | 4/2007 |
| JP | 2009-171634 | 7/2009 |
| JP | 2010-217454 | 9/2010 |
| WO | WO 2007/088636 A1 | 8/2007 |

OTHER PUBLICATIONS

Kei Watanabe, et al., "Athermal driving of InP npin Mach-Zehnder Modulator", 2010, the transactions of the IEICE society conference, Electronics C-3-54, with Partial English Translation, 2010, 2 pages.

* cited by examiner

*Primary Examiner* — Eric Bolda
(74) *Attorney, Agent, or Firm* — Oblon, Spivak, McClelland, Maier & Neustadt, L.L.P.

(57) ABSTRACT

An optical modulator includes first and second modulation waveguides, a demultiplexer, first and second phase adjustment waveguides that changes phases of a light of the first and second modulation waveguides, a multiplexer that combines light outputs from the first and second phase adjustment waveguides, a gain controller and a modulator bias controller in which voltages of the first and second modulation signals are controlled so that a result of adding light from the first modulation waveguide to light from the second modulation waveguide where light from the first modulation waveguide has a predetermined phase is equal to a result of adding light from the first modulation waveguide to light from the second modulation waveguide where light from the second modulation waveguide has a predetermined phase. A phase-adjustment bias controller that controls phase amounts changed by the first and second phase adjustment waveguides so as to cancel phase errors.

6 Claims, 8 Drawing Sheets

OPTICAL MODULATOR AND OPTICAL MODULATION METHOD

BACKGROUND OF THE INVENTION

1. Field of the Invention

The present invention relates to an optical modulator and an optical modulation method.

2. Description of the Related Art

As a phase modulator used for high-speed optical communications, a Mach-Zehnder modulator has been commercially available. Modulators made of ferroelectric such as lithium niobate are conventionally used as the Mach-Zehnder modulators (for example, see Japanese Patent Application Laid-open No. 2009-171634). Furthermore, semiconductor Mach-Zehnder modulators made of semiconductor are increasingly put to practical use for downsizing and power saving of devices (for example, see "2010, the transactions of the IEICE society conference", Electronics C-3-54, 2010).

For example, the semiconductor Mach-Zehnder modulator is configured as follows. A first modulation waveguide constitutes a first arm and a second modulation waveguide constitutes a second arm. A demultiplexer splits a light output from a light source and inputs split lights to the first and second arms, respectively. The first and second arms modulate phases of the input lights and a multiplexer combines the phase-modulated lights and outputs a resultant light.

Drivers amplify differential modulation signals generated based on codes to be transmitted from a signal source. First and second bias tees apply biases to the amplified signals and resultant signals are input to the first and second modulation waveguides as voltages, respectively. Waveguide refraction factors of the first and second modulation waveguides change according to the input voltages and the first and second modulation waveguides modulate the phases of lights passing therethrough. A gain controller controls the gain of the driver and voltages applied from a modulator bias controller controls the biases applied by the first and second bias tees.

An operation for performing phase modulation using a semiconductor Mach-Zehnder modulator described above is described below. The output light from the multiplexer is the sum of amplitudes of the lights input to the first and second arms. The gain controller adjusts gains of the drivers so that the lights modulated by the first and second arms have a phase variation π. The gain controller also adjusts the gains of the drivers so that ranges of phase changes by the first and second modulation waveguides shift from each other by π, and so that the phases output from the first and second modulation waveguides become opposite. For example, when the range of the phase change by the first modulation waveguide is 0 to π, the range of the phase change by the second modulation waveguide is π to 2π. With this adjustment, the output light from the multiplexer has two states (for example, 0 and π) at the same amplitude and having a phase difference π. These two states are made to correspond to codes [0] and [1], respectively, thereby performing light transmission by phase modulation.

However, the conventional semiconductor Mach-Zehnder modulator described above has the following problems. In the conventional semiconductor Mach-Zehnder modulator, because phase modulation is performed based on the quantum-confined Stark effect, the first and second modulation waveguides change in absorbed amounts simultaneously with the changes in refraction factors according to the voltages of the differential modulation signals. Therefore, the lights passing through the first and second modulation waveguides change in amplitude simultaneously with the phase changes and the output light changes in amplitude between the codes [0] and [1].

SUMMARY OF THE INVENTION

It is an object of the present invention to at least partially solve the problems in the conventional technology.

According to an aspect of the present invention, there is provided an optical modulator including: a first modulation waveguide that performs phase modulation based on a first modulation signal, which is an electric signal generated based on a code; a second modulation waveguide that performs phase modulation based on a second modulation signal, which is an electric signal paired with the first modulation signal as differential signals; a demultiplexer that splits an input light into a light input to the first modulation waveguide and a light input to the second modulation waveguide; a first phase adjustment waveguide that changes a phase of a light phase-modulated by the first modulation waveguide; a second phase adjustment waveguide that changes a phase of a light phase-modulated by the second modulation waveguide; a multiplexer that combines a light output from the first phase adjustment waveguide with a light output from the second phase adjustment waveguide, and outputs a combined light as a phase modulated light; an applied voltage controller that controls voltages of the first modulation signal and the second modulation signal; and a phase-adjustment bias controller that controls phase amounts changed by the first phase adjustment waveguide and the second phase adjustment waveguide. The applied voltage controller controls the voltages of the first modulation signal and the second modulation signal based on characteristics indicating a relation of amplitudes between input voltages and output lights of the first modulation waveguide and the second modulation waveguide so that a result of adding an amplitude of an output light from the first modulation waveguide to an amplitude of an output light from the second modulation waveguide in a case the output light from the first modulation waveguide and the output light from the second modulation waveguide equally have a predetermined phase is equal to a result of adding an amplitude of the output light from the first modulation waveguide to an amplitude of the output light from the second modulation waveguide in a case the output light from the first modulation waveguide and the output light from the second modulation waveguide have different predetermined phases, and the phase-adjustment bias controller controls phase amounts changed by the first phase adjustment waveguide and the second phase adjustment waveguide so as to cancel phase errors in desired values, the phase errors resulting from control of the applied voltage controller.

According to another aspect of the present invention, there is provided an optical modulation method for an optical modulator, the optical modulator including a first modulation waveguide that performs phase modulation based on a first modulation signal, which is an electric signal generated based on a code, and a second modulation waveguide that performs phase modulation based on a second modulation signal, which is an electric signal paired with the first modulation signal as differential signals, the optical modulation method including: splitting an input light into a light input to the first modulation waveguide and a light input to the second modulation waveguide; changing a phase of a light phase-modulated by the first modulation waveguide; changing a phase of a light phase-modulated by the second modulation waveguide; combining a light output from the first phase adjustment waveguide with a light output from the second phase adjustment waveguide, and outputting a combined light as a phase modulated light; controlling voltages of the first modulation signal and the second modulation signal; and controlling phase amounts changed by the first phase adjustment waveguide and the second phase adjustment waveguide. In the controlling voltages of the first modulation signal and the second modulation signal, the voltages of the first modulation signal and the second modulation signal are controlled based on characteristics indicating a relation of amplitudes between input voltages and output lights of the first modulation waveguide and the second modulation waveguide so that a result of adding an amplitude of an output light from the first modulation waveguide to an amplitude of an output light from the second modulation waveguide in a case the output light from the first modulation waveguide and the output light from the second modulation waveguide equally have a predetermined phase is equal to a result of adding an amplitude of the output light from the first modulation waveguide to an amplitude of the output light from the second modulation waveguide in a case the output light from the first modulation waveguide and the output light from the second modulation waveguide have different predetermined phases, and in the controlling phase amounts changed by the first phase adjustment waveguide and the second phase adjustment waveguide, phase amounts changed in the changing the phase of the light phase-modulated by the first modulation waveguide and the changing the phase of the light phase-modulated by the second modulation waveguide are controlled so as to cancel phase errors in desired values, the phase errors resulting from the controlling voltages of the first modulation signal and the second modulation signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical modulator and an optical modulation method according to the present invention will be explained below in detail with reference to the accompanying drawings. The present invention is not limited to the embodiments.

Figure 1:
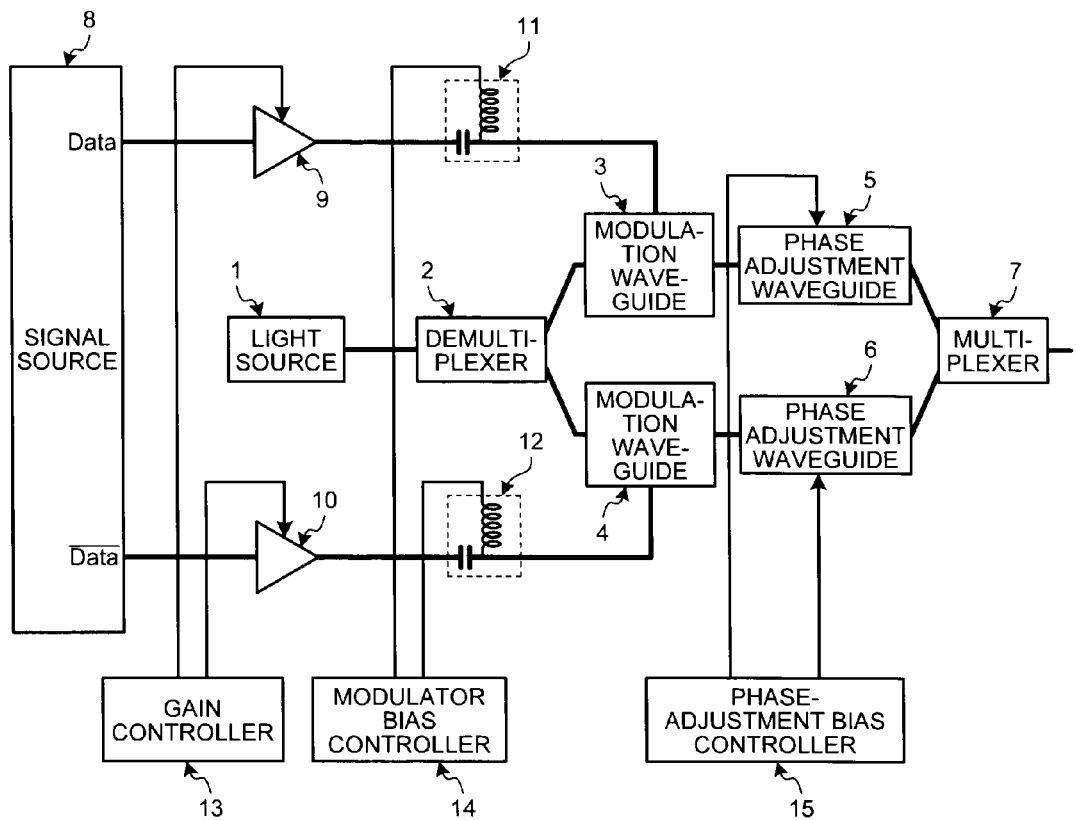
FIG. 1 is an example of a configuration of an optical modulator according to a first embodiment of the present invention.

FIG. 1 is an example of a configuration of an optical modulator according to a first embodiment of the present invention. As shown in FIG. 1, the optical modulator according to the first embodiment is a semiconductor Mach-Zehnder modulator, and includes a light source 1, a demultiplexer 2, modulation waveguides 3 and 4 (first and second modulation waveguides), phase adjustment waveguides 5 and 6, a multiplexer 7, a signal source 8, drivers (amplifiers) 9 and 10, bias tees (bias applying units) 11 and 12, a gain controller 13, a modulator bias controller 14, and a phase-adjustment bias controller 15. While an example in which the optical modulator is a semiconductor Mach-Zehnder modulator is described in the first embodiment, this embodiment is also applicable to other optical modulators having a similar configuration.

The modulation waveguide 3 and the phase adjustment waveguide 5 constitute a first arm, and the modulation waveguide 4 and the phase adjustment waveguide 6 constitute a second arm. A light output from the light source 1 is split by the demultiplexer 2 and split lights are input to the first and second arms, respectively. The lights input to the first and second arms are subjected to phase modulation and then input to the multiplexer 7. The multiplexer 7 then combines the light output from the first arm with that from the second arm and outputs a light.

The drivers 9 and 10 amplify differential modulation signals (Data and /Data that is an inverted signal of Data) generated by the signal source 8 based on to-be-transmitted codes at different gains, respectively. The bias tee 11 applies a bias (voltage) to the signal amplified by the driver (amplifier) 9 and inputs the bias-applied signal to the modulation waveguide 3 as a voltage. Similarly, the bias tee 12 applies a bias (voltage) to the signal amplified by the driver (amplifier) 10 and inputs the bias-applied signal to the modulation waveguide 4 as a voltage.

The modulation waveguides 3 and 4 change in waveguide refraction factors according to the input voltages. The modulation waveguides 3 and 4 thereby modulate the phase of passing lights according to the input voltages, respectively.

The gain controller 13 controls the gains of the drivers 9 and 10, and the bias tees 11 and 12 apply the biases to signals according to voltages applied by the modulator bias controller 14. The phase-adjustment bias controller 15 applies voltages to the phase adjustment waveguides 5 and 6, respectively. The biases applied by the bias tees 11 and 12 are voltages applied to control operating points for optical modulation in the modulation waveguides 3 and 4. The modulator bias controller 14 controls the bias tees 11 and 12 so that the operation points in the modulation waveguides 3 and 4 are equal to a desired operation point.

Figure 2:
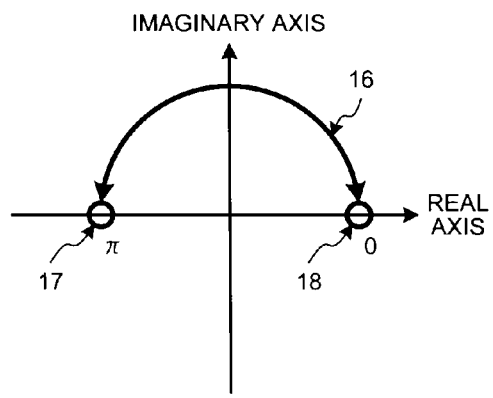
FIG. 2 is an example of a locus of an amplitude and a phase of a first modulated light modulated by a first arm.
Figure 3:
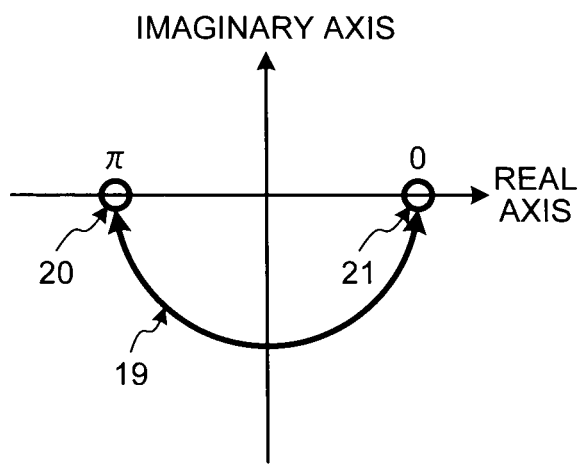
FIG. 3 is an example of a locus of an amplitude and a phase of a second modulated light modulated by a second arm.
Figure 4:
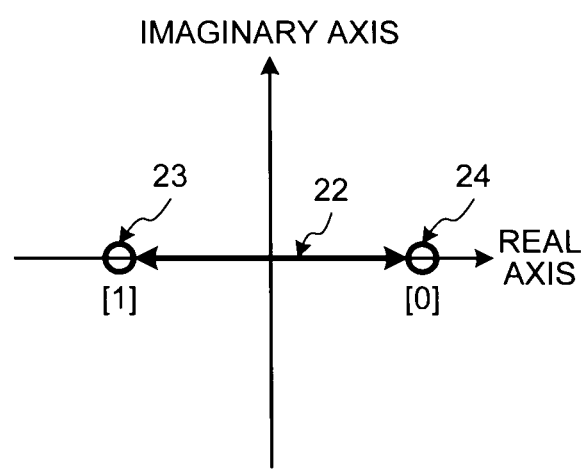
FIG. 4 is an example of a locus of an amplitude and a phase of a light output from a multiplexer.

A basic operation for the phase modulation using a semiconductor Mach-Zehnder modulator is described next. FIG. 2 is an example of a locus of an amplitude and a phase of a first modulated light modulated by the first arm, and FIG. 3 is an example of a locus of an amplitude and a phase of a second modulated light modulated by the second arm. FIG. 4 is an example of a locus of an amplitude and a phase of a light output from the multiplexer 7. In FIGS. 2 to 4, a distance from an origin indicates an absolute value of the amplitude of light and an angle from an X axis (a horizontal axis) indicates the phase of the light. FIGS. 2 to 4 depict states where no absorption occurs in the modulation waveguides 3 and 4.

As shown in FIG. 2, the amplitude and phase of the first modulated light draw a locus 16 connecting a point 18 of a phase 0 to a point 17 of a phase π at a constant amplitude. It is assumed that the range of the phase change of the first modulated light, that is, the range of the phase change of the locus 16 is 0 to π. Because the differential modulation signals are input to the modulation waveguides 3 and 4, the light modulated by the phase adjustment waveguide 5 is opposite in phase to that by the phase adjustment waveguide 6. However, actual lights are often different from ideal values because of a manufacturing error, a control to make constant the output light from the multiplexer 7 irrespectively of codes (described later) and the like. Therefore, the phase-adjustment bias controller 15 adjusts the phase adjustment waveguides 5 and 6 to correct phase errors (phase shift from desired phases) in the first modulated light and the second modulated light by applying the voltages to the phase adjustment waveguides 5 and 6.

In this way, as shown in FIG. 3, the amplitude and phase of the second modulated light draw a locus 19 connecting a point 20 of the phase π to a point 21 of the phase 2π at a constant amplitude. For example, when the phase of the first modulated light is 0, the phase of the second modulated light is π. When the phase of the first modulated light is π, the phase of the second modulated light is 2π(=0). When the phase of the first modulated light changes from 0 to π according to the locus 16, the phase of the second modulated light changes from 2π to π according to the locus 19.

Accordingly, as shown in FIG. 4, a trace 22 of the amplitude and phase of the output light output from the multiplexer 7 is a locus connecting a point 23 of the phase π to a point 24 of the phase 0. The amplitude is 0 except in the phases π and 0 and the light output from the multiplexer 7 has the two phases of π and 0. The phase modulation can be performed by making the two states of the phases π and 0 correspond to the to-be-transmitted codes [0] and [1], respectively.

Meanwhile, the semiconductor Mach-Zehnder modulator performs modulation by changing refraction factors of the modulation waveguides 3 and 4 based on the quantum-confined Stark effect. Therefore, in principle, absorbed amounts change simultaneously with changes in the refraction factors according to the voltages of the modulation signals.

Figure 5:
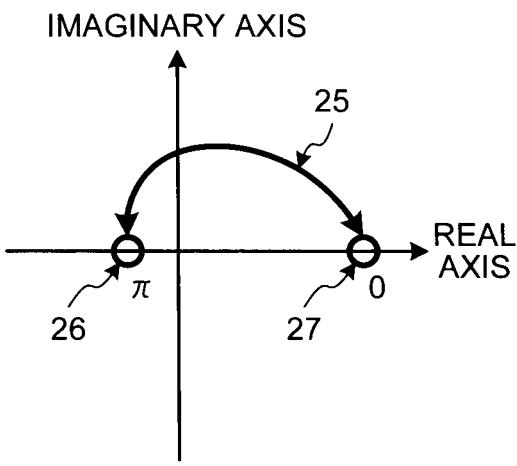
FIG. 5 is an example of a locus of the amplitude and phase of the first modulated light modulated by the first arm in a case of considering absorption.
Figure 6:
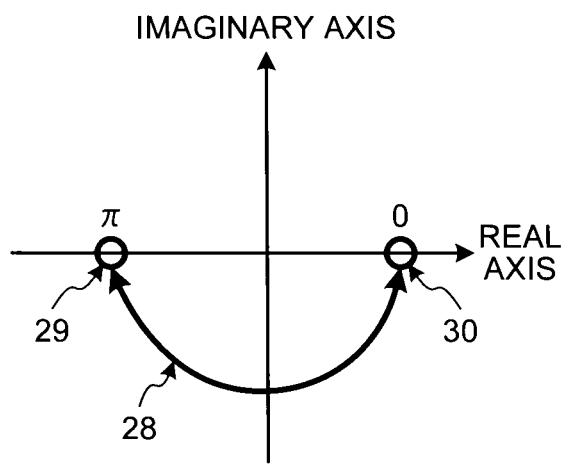
FIG. 6 is an example of a locus of the amplitude and phase of a second modulated light modulated by the second arm in a case of considering absorption.
Figure 7:
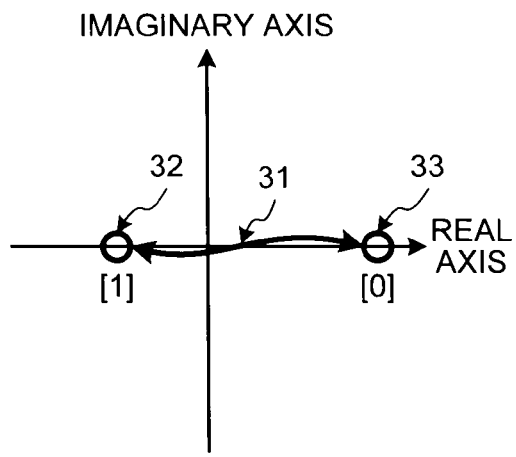
FIG. 7 is an example of a locus of the amplitude and phase of a light output from the multiplexer in a case of considering absorption.

FIG. 5 is an example of a locus of the amplitude and phase of the first modulated light modulated by the first arm in a case of considering absorption, and FIG. 6 is an example of a locus of the amplitude and phase of the second modulated light modulated by the second arm in a case of considering absorption. FIG. 7 is an example of a locus of the amplitude and phase of the light output from the multiplexer 7 in a case of considering absorption.

As shown in FIG. 5, the amplitude and phase of the first modulated signal draw a locus 25 connecting a point 26 of the phase π to a point 27 of the phase 0, and the magnitude of the amplitude changes simultaneously with the phase change. Similarly, as shown in FIG. 6, the amplitude and phase of the second modulated signal draw a locus 28 connecting a point 29 of the phase π to a point 30 of the phase 0, and the magnitude of the amplitude changes simultaneously with the phase change. Accordingly, as shown in FIG. 7, a locus 31 of the amplitude and phase of the output light from the multiplexer 7 is a locus connecting a point 32 of the phase π to a point 33 of the phase 0, and the output light has different amplitudes between the codes [0] and [1].

Figure 8:
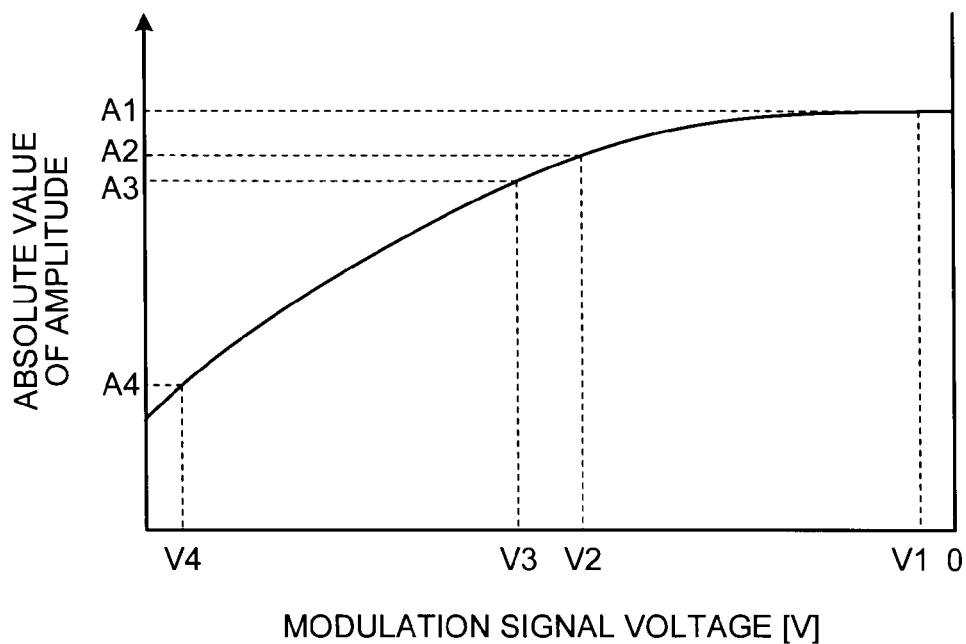
FIG. 8 is an example of a relation between a voltage of a modulation signal applied to a modulation waveguide and an absolute value of the amplitude of a light modulated and output by the first arm.
Figure 9:
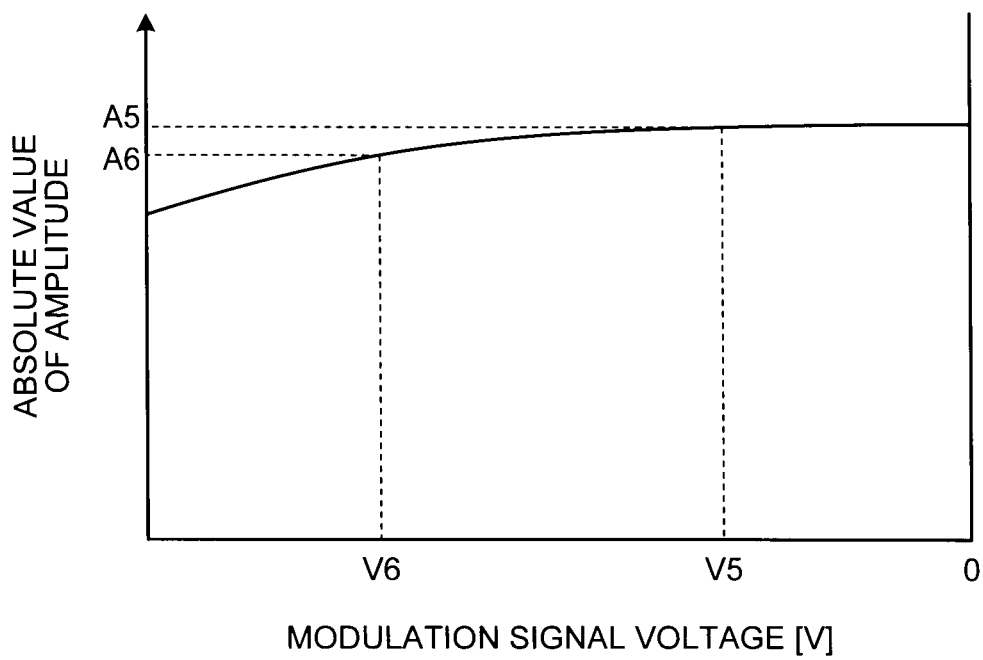
FIG. 9 is an example of a relation between a voltage of a modulation signal applied to a modulation waveguide and an absolute value of the amplitude of a light modulated and output by the second arm.

FIG. 8 is an example of a relation between a voltage of the modulation signal applied to the modulation waveguide 3 (a modulation signal voltage) and an absolute value of the amplitude of a light modulated and output by the first arm. When the absorption in the modulation waveguides 3 and 4 is considered, the relation between the modulation signal voltage and the absolute value of the amplitude of the output light is nonlinear as shown in FIG. 8 and the relation normally differs in shape according to the waveguide. FIG. 9 is an example of a relation between a voltage of the modulation signal applied to the modulation waveguide 4 and an absolute value of the amplitude of a light modulated and output by the second arm.

As shown in FIG. 8, when the modulation signal voltage applied to the modulation waveguide 3 changes between V3 and V4, the absolute value of the amplitude of the light modulated and output by the first arm changes from A3 to A4. A3 indicates the absolute value of the amplitude in the phase 0 (at the point 27) in FIGS. 5 and A4 indicates the absolute value of the amplitude in the phase π (at the point 26) in FIG. 5. On the other hand, as shown in FIG. 9, when the modulation signal voltage applied to the modulation waveguide 4 changes between V5 and V6, the absolute value of the amplitude of the light modulated and output by the second arm changes from A5 to A6. A5 indicates the absolute value of the amplitude in the phase π (at the point 29) in FIG. 6 and A6 indicates the absolute value of the amplitude in the phase 2π (at the point 30) in FIG. 6. As a result, the amplitude A[0] in a case of outputting the code [0] is expressed by the following Equation (1) and the amplitude A[1] in a case of outputting the code [1] is expressed by the following Equation (2).

$$A[0]=A3+A6 \tag{1}$$

$$A[1]=A4+A5 \tag{2}$$

If the amplitude A[0] expressed by the Equation (1) differs from the amplitude A[1] expressed by the Equation (2), the output signal differs in intensity according to the code as shown in FIG. 7. In this way, when the modulation waveguides 3 and 4 are asymmetric in absorption characteristic, the output light from the multiplexer 7 differs according to the value of the code (whether the code is [0] or [1]). Similarly, when the first and second arms are asymmetric between the demultiplexer 2 and the multiplexer 7, the output light from the multiplexer 7 has different intensities. The conventional phase modulation method has problems that the intensity changes during the phase modulation and transmission performance deteriorates.

On the other hand, in the first embodiment, the Mach-Zehnder modulator performs the following operations, thereby preventing the output light from the multiplexer 7 from changing in intensity. As described above, when the amplitude A[0] expressed by the Equation (1) differs from the amplitude A[1] expressed by the Equation (2), the output signal differs in intensity according to the code. In the first embodiment, the gain of the driver 9 and the bias of the modulation signal applied to the modulation waveguide 3 are adjusted. With this configuration, the absolute value of the amplitude of the output light from the first arm changes from A1 to A2.

When the bias of the modulation signal voltage is changed, an absolute phase during the modulation in the modulation waveguide 3 changes. Due to this, in the first embodiment, the phase-adjustment bias controller 15 controls the phase adjustment waveguide 5 to adjust the phase of the output light from the modulation waveguide 3, thereby canceling the influence of the changed bias of the modulation signal voltage.

Figure 10:
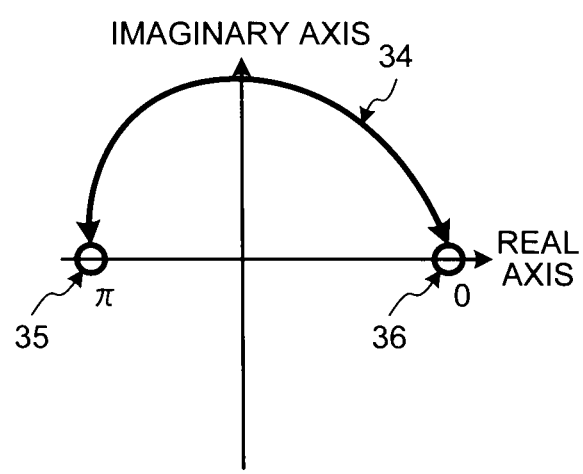
FIG. 10 is an example of a locus of the amplitude and phase of a first modulated light modulated by the first arm after an adjustment.
Figure 11:
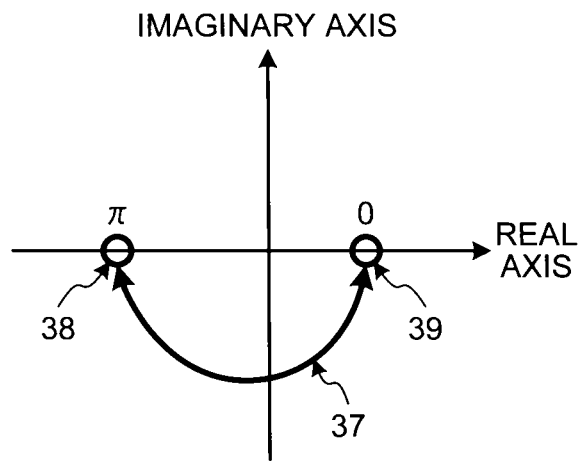
FIG. 11 is an example of a locus of the amplitude and phase of the second modulated light modulated by the second arm after an adjustment.
Figure 12:
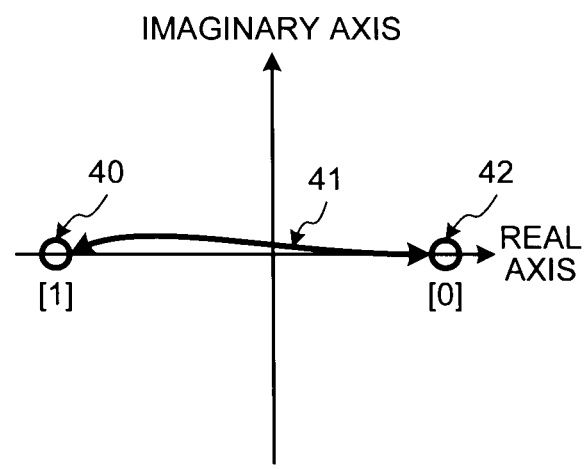
FIG. 12 is an example of a locus of the amplitude and phase of a light output from the multiplexer after an adjustment.

FIG. 10 is an example of a locus of the amplitude and phase of the first modulated light modulated by the first arm after the adjustment described above, and FIG. 11 is an example of a locus of the amplitude and phase of the second modulated light modulated by the second arm after the adjustment described above. FIG. 12 is an example of a locus of the amplitude and phase of a light output from the multiplexer 7 after the adjustment described above.

As shown in FIG. 10, the amplitude and phase of the first modulated light after the adjustment described above draw a locus 34 connecting a point 35 of the phase π to a point 36 of the phase 0. Furthermore, as shown in FIG. 11, the amplitude and phase of the second modulated light after the adjustment described above draw a locus 37 connecting a point 38 of the phase π to a point 39 of the phase 0. Accordingly, as shown in FIG. 12, the amplitude and phase of the output light from the multiplexer 7 draw a locus 41 connecting a point 40 of the phase π to a point 42 of the phase 0.

In this case, an amplitude A[0]' at a time of outputting the code [0] is expressed by the following Equation (3) and an amplitude A[1]' at a time of outputting the code [1] is expressed by the following Equation (4).

$$A[0]'=A1+A6 \quad (3)$$

$$A[1]'=A2+A5 \quad (4)$$

Therefore, it suffices that the gain controller 13 and the modulator bias controller 14 determine variation ranges (V1, V2) of the modulation signal voltage so that the amplitude A[0]' expressed by the Equation (3) is equal to the amplitude A[1]' expressed by the Equation (4) based on the relation between the voltage of the modulation signal (modulation signal voltage) shown in FIG. 8 and the absolute value of the amplitude of the light modulated and output by the first arm. While any method can be used as the method of determining V1 and V2, for example, the bias voltage applied by the modulator bias controller 14 is changed by a predetermined value, A1 and A2 are determined to satisfy A1+A6=A2+A5, and corresponding V1 and V2 are determined based on the relation between the voltage of the modulation signal (modulation signal voltage) and the absolute value of the amplitude of the light modulated and output by the first arm shown in FIG. 8. The gain of the driver 9 is determined based on V1 and V2.

The phase-adjustment bias controller 15 controls the phase adjustment waveguide 5 to adjust the phase shift resulting from changing the variation range of the modulation signal voltage.

In the first embodiment, the variation range of the modulation signal voltage applied to the modulation waveguide 3 is changed so that the amplitude A[0]' is equal to the amplitude A[1]'. Alternatively, the variation range of the modulation signal voltage applied to the modulation waveguide 4 can be changed without changing the variation range of the modulation signal voltage applied to the modulation waveguide 3 so that the amplitude A[0]' is equal to the amplitude A[1]'. In another alternative, both the variation range of the modulation signal voltage applied to the modulation waveguide 4 and that of the modulation signal voltage applied to the modulation waveguide 3 can be changed so that the amplitude A[0]' is equal to the amplitude A[1]'.

While both the variation range of the modulation signal voltage (that is, the gains of the drivers 9 and 10) and the bias voltage are changed so that the amplitude A[0]' is equal to the amplitude A[1]', one of the ranges can be changed so that A[0]' is equal to A[1]'.

The first embodiment has been explained while referring to an example of performing binary modulation for the code [0] or [1]. Alternatively, the operation in the first embodiment can be similarly applied to an optical modulator that performs multilevel modulation by providing a plurality of phase modulators each including the first and second arms, inputs split lights to the respective arms of these phase modulators from the demultiplexer 2, and inputs a multilevel differential modulation signal from the signal source 8.

Figure 13:
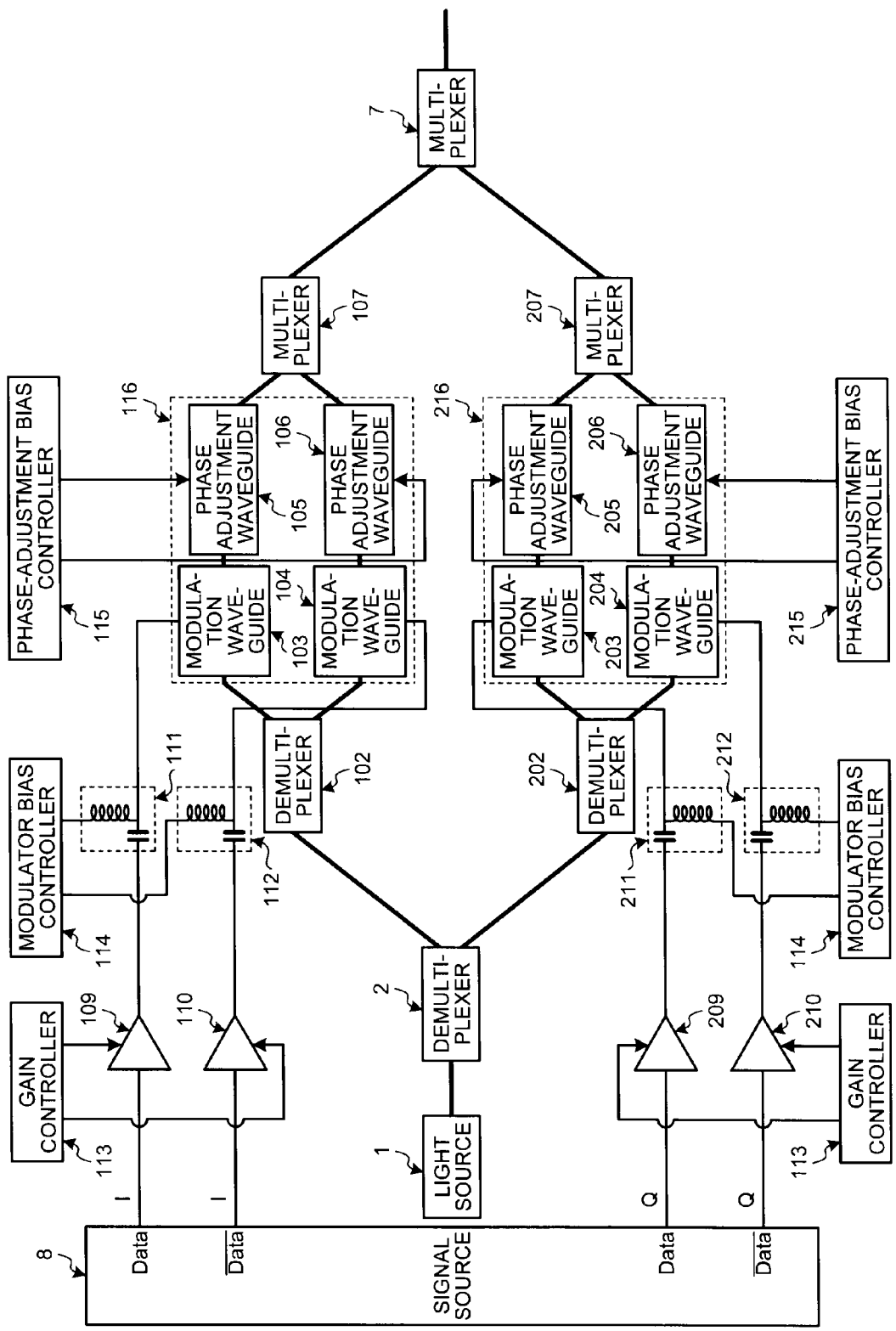
FIG. 13 is an example of a configuration of an optical modulator that performs multilevel modulation.

FIG. 13 is an example of a configuration of the optical modulator that performs multilevel modulation. The optical modulator shown in FIG. 13 includes phase modulators 116 and 216 each including the first and second arms. In this example, multilevel modulation signals are assumed as differential quadrature phase shift keying signals (hereinafter, DQPSK signals). A differential modulation signal corresponding to an in-phase component (hereinafter, "I-component") is input to modulation waveguides 103 and 104 of the phase modulator 116. The phase modulator 116 is controlled so that the result of adding up absolute values of amplitudes of lights output from the modulation waveguides 103 and 104 for the code [0] is equal to that for the code [1]. That is, similarly to the descriptions with reference to FIG. 1, at least one of a gain controller 113 and a modulator bias controller 114 is used to determine the variation range of the modulation signal voltage and the bias voltage. A differential modulation signal corresponding to a quadrature-phase component (hereinafter, "Q-component") is input to modulation waveguides 203 and 204 of the phase modulator 216. The phase modulator 216 is controlled similarly to the phase modulator 116. A π/2 phase shifter (not shown) is provided between the demultiplexer 2 and a demultiplexer 202 or the multiplexer 7 and a multiplexer 207. After the π/2 phase shifter gives a phase difference to the Q-component, the multiplexer 7 combines the Q-component with the I-component. The input multilevel modulation signals are not limited to the DQPSK signals but can be signals based on the other modulation methods. In addition, the number of phase modulators can be increased. Descriptions of binary modulation to be given later can be also applied to multilevel modulation.

In the first embodiment, the gain controller 13 and the modulator bias controller 14 are provided separately; however, because the gain controller 13 and the modulator bias controller 14 are used to adjust the voltages applied to the modulation waveguides 3 and 4, the two controllers 13 and 14 can be integrated into a single applied voltage controller.

As described above, the variation range of the modulation signal voltage applied to at least one of the modulation waveguides 3 and 4 is changed so that the amplitude A[0]' is equal to the amplitude A[1]', and the phase-adjustment bias controller 15 controls the phase adjustment waveguide 5 so as to change the phase change accompanying the change in the variation range. Due to this, even when absorption occurs in the modulation waveguides 3 and 4, it is possible to eliminate the intensity difference dependent on the value of the code.

Accordingly, modulation without any intensity variation can be performed, whereby even a semiconductor Mach-Zehnder modulator in which absorption occurs in modulation waveguides can prevent deterioration in the transmission performance due to the absorption.

Figure 14:
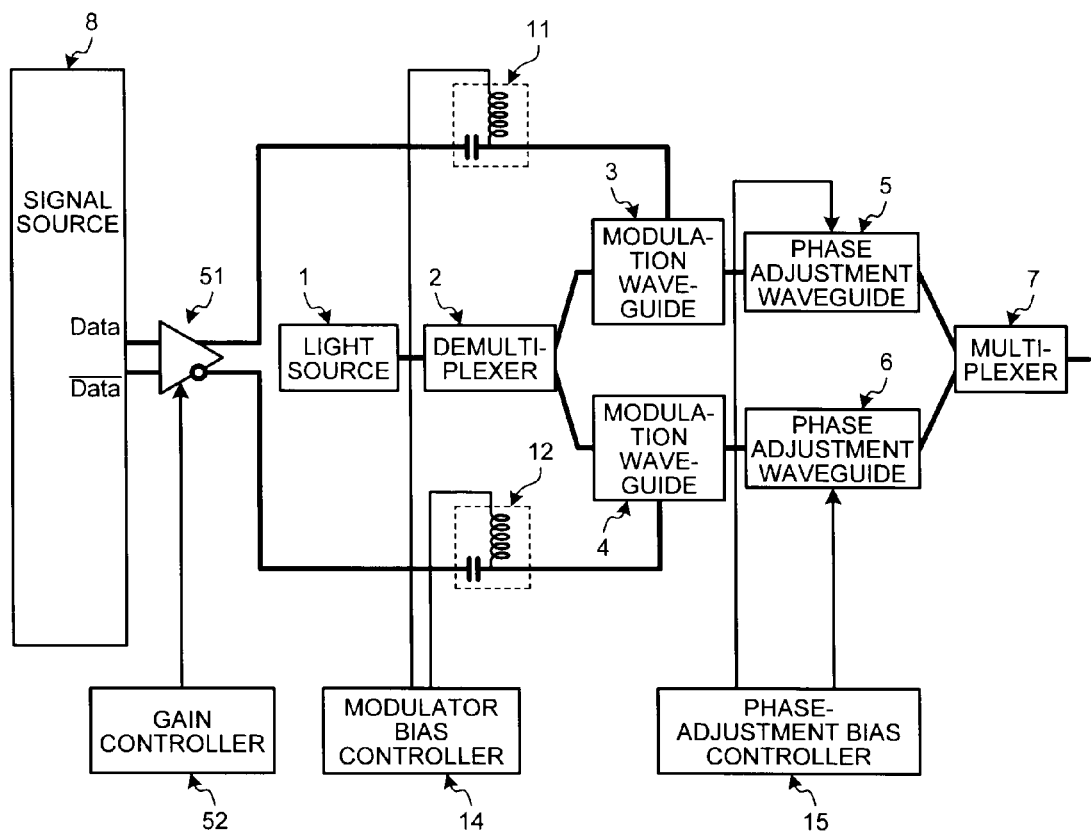
FIG. 14 is an example of a configuration of an optical modulator according to a second embodiment of the present invention.

FIG. 14 is an example of a configuration of an optical modulator according to a second embodiment of the present invention. The optical modulation according to the second embodiment is similar to that according to the first embodiment except that the optical modulator according to the second embodiment includes a driver 51 in place of the drivers 9 and 10 and a gain controller 52 in place of the gain controller 13.

In the first embodiment, amplitudes of the modulation signals (voltages) applied to the modulation waveguides 3 and 4 are independently adjusted. On the other hand, in the second embodiment, the amplitudes of the modulation signals (voltages) applied to the modulation waveguides 3 and 4 are adjusted to be equal assuming that a phase change per unit applied voltage is considered constant in the modulation waveguides 3 and 4.

The driver 51 amplifies differential modulation signals (Data and /Data that is the inverted signal of Data) generated by the signal source 8 based on to-be-transmitted codes at the same gain. Meanwhile, in the second embodiment, the bias voltages applied to the modulation waveguides 3 and 4 are independently controlled so that the amplitude A[0]' is equal to the amplitude A[1]' similarly to the first embodiment. Furthermore, similarly to the first embodiment, the phase-adjustment bias controller 15 controls the phase adjustment waveguide 5 so as to adjust the phase shift resulting from the change in the variation range of the modulation signal voltage. The optical modulator according to the second embodiment operates similarly to that according to the first embodiment except for the operation described above.

As described above, according to the second embodiment, one driver is used to control the amplitudes of modulation signals applied to the modulation waveguides 3 and 4, and the bias voltages are adjusted so that the amplitude A[0]' is equal to the amplitude A[1]' for the modulation waveguides 3 and 4. With this configuration, it is possible to eliminate the intensity difference dependent on the value of the code even when absorption occurs in the modulation waveguides 3 and 4 with a simpler configuration than that of the optical modulator according to the first embodiment. Accordingly, modulation without any intensity variation can be performed, whereby even a semiconductor Mach-Zehnder modulator in which absorption occurs in modulation waveguides can prevent deterioration in the transmission performance due to the absorption.

According to the present invention, it is possible to make the intensity of output light constant irrespectively of the value of a code during phase modulation.

What is claimed is:

1. An optical modulator comprising:
a first modulation waveguide that performs phase modulation based on a first modulation signal, which is an electric signal generated based on a code;
a second modulation waveguide that performs phase modulation based on a second modulation signal, which is an electric signal paired with the first modulation signal as differential signals;
a demultiplexer that splits an input light into a light input to the first modulation waveguide and a light input to the second modulation waveguide;
a first phase adjustment waveguide that changes a phase of a light phase-modulated by the first modulation waveguide;
a second phase adjustment waveguide that changes a phase of a light phase-modulated by the second modulation waveguide;
a multiplexer that combines a light output from the first phase adjustment waveguide with a light output from the second phase adjustment waveguide, and outputs a combined light as a phase modulated light;
an applied voltage controller that controls voltages of the first modulation signal and the second modulation signal; and
a phase-adjustment bias controller that controls phase amounts changed by the first phase adjustment waveguide and the second phase adjustment waveguide, wherein
the applied voltage controller controls the voltages of the first modulation signal and the second modulation signal based on characteristics indicating a relation of amplitudes between input voltages and output lights of the first modulation waveguide and the second modulation waveguide so that a result of adding an amplitude of an output light from the first modulation waveguide to an amplitude of an output light from the second modulation waveguide in a case the output light from the first modulation waveguide and the output light from the second modulation waveguide equally have a predetermined phase is equal to a result of adding an amplitude of the output light from the first modulation waveguide to an amplitude of the output light from the second modulation waveguide in a case the output light from the first modulation waveguide and the output light from the second modulation waveguide have different predetermined phases, and
the phase-adjustment bias controller controls phase amounts changed by the first phase adjustment waveguide and the second phase adjustment waveguide so as to cancel phase errors in desired values, the phase errors resulting from control of the applied voltage controller.

2. The optical modulator according to claim 1, further comprising:
an amplifier that amplifies the first electric signal generated based on a code and the second electric signal that is an electric signal paired with the first electric signal as differential signals;
a first bias applying unit that adjusts a bias voltage applied to the first electric signal; and
a second bias applying unit that adjusts a bias voltage applied to the second electric signal, wherein
the first modulation signal applied to the first modulation waveguide is set equal to the first electric signal that is amplified by the amplifier and to which a bias voltage is applied by the first bias applying unit,
the second modulation signal applied to the second modulation waveguide is set equal to the second electric signal that is amplified by the amplifier and to which a bias voltage is applied by the second bias applying unit,
the applied voltage controller includes
a gain controller that controls a gain of the amplifier, and
a modulator bias controller that controls the bias voltages applied by the first bias applying unit and the second bias applying unit, and wherein
the applied voltage controller controls the voltage of each of the first modulation signal and the second modulation signal using at least one of the gain and the bias voltage.

3. The optical modulator according to claim 2, wherein the gain controller controls gains corresponding to the first electric signal and to the second electric signal independently.

4. The optical modulator according to claim 2, wherein the gain controller sets a gain corresponding to the first electric signal equal to a gain corresponding to the second electric signal.

5. The optical modulator according to claim 1, wherein
the code is set to codes that constitute multilevel modulation signals,
the optical modulator comprises a plurality of phase modulators each including the first and second modulation waveguides and the first and second phase adjustment waveguides,
the demultiplexer splits an input light into lights input to the first and second modulation waveguides of a plurality of the phase modulators, respectively, and
the multiplexer combines output lights from the phase modulators.

6. An optical modulation method for an optical modulator, the optical modulator including a first modulation waveguide that performs phase modulation based on a first modulation signal, which is an electric signal generated based on a code, and a second modulation waveguide that performs phase modulation based on a second modulation signal, which is an electric signal paired with the first modulation signal as differential signals, the optical modulation method comprising:
splitting an input light into a light input to the first modulation waveguide and a light input to the second modulation waveguide;
changing a phase of a light phase-modulated by the first modulation waveguide;
changing a phase of a light phase-modulated by the second modulation waveguide;
combining a light output from the first phase adjustment waveguide with a light output from the second phase adjustment waveguide, and outputting a combined light as a phase modulated light;
controlling voltages of the first modulation signal and the second modulation signal; and
controlling phase amounts changed by the first phase adjustment waveguide and the second phase adjustment waveguide, wherein
in the controlling voltages of the first modulation signal and the second modulation signal, the voltages of the first modulation signal and the second modulation signal are controlled based on characteristics indicating a relation of amplitudes between input voltages and output lights of the first modulation waveguide and the second modulation waveguide so that a result of adding an amplitude of an output light from the first modulation waveguide to an amplitude of an output light from the second modulation waveguide in a case the output light from the first modulation waveguide and the output light from the second modulation waveguide equally have a predetermined phase is equal to a result of adding an amplitude of the output light from the first modulation waveguide to an amplitude of the output light from the second modulation waveguide in a case the output light from the first modulation waveguide and the output light from the second modulation waveguide have different predetermined phases, and
in the controlling phase amounts changed by the first phase adjustment waveguide and the second phase adjustment waveguide, phase amounts changed in the changing the phase of the light phase-modulated by the first modulation waveguide and the changing the phase of the light phase-modulated by the second modulation waveguide are controlled so as to cancel phase errors in desired values, the phase errors resulting from the controlling voltages of the first modulation signal and the second modulation signal.

* * * * *